(12) United States Patent
Jiang et al.

(10) Patent No.: US 12,406,150 B2
(45) Date of Patent: Sep. 2, 2025

(54) MACHINE LEARNING SYSTEMS AND METHODS FOR MANY-HOP FACT EXTRACTION AND CLAIM VERIFICATION

(71) Applicant: Insurance Services Office, Inc., Jersey City, NJ (US)

(72) Inventors: Yichen Jiang, Seattle, WA (US); Shikha Bordia, Jersey City, NJ (US); Zheng Zhong, Seattle, WA (US); Charles Dognin, Rockville Centre, NY (US); Maneesh Kumar Singh, Princeton, NJ (US); Mohit Bansal, Carrboro, NC (US)

(73) Assignee: Insurance Services Office, Inc., Jersey City, NJ (US)

( * ) Notice: Subject to any disclaimer, the term of this patent is extended or adjusted under 35 U.S.C. 154(b) by 273 days.

(21) Appl. No.: 17/534,899

(22) Filed: Nov. 24, 2021

(65) Prior Publication Data

US 2022/0164546 A1    May 26, 2022

Related U.S. Application Data

(60) Provisional application No. 63/118,074, filed on Nov. 25, 2020.

(51) Int. Cl.
*G06F 40/40* (2020.01)
*G06F 40/226* (2020.01)
(Continued)

(52) U.S. Cl.
CPC ............ *G06F 40/40* (2020.01); *G06F 40/226* (2020.01); *G06F 40/295* (2020.01); *G06N 5/04* (2013.01); *G06F 16/35* (2019.01)

(58) Field of Classification Search
CPC ...... G06F 40/40; G06F 40/226; G06F 40/295; G06F 16/35; G06F 40/284; G06N 5/04; G06N 3/08; G06N 5/045; G06N 20/00
See application file for complete search history.

(56) References Cited

U.S. PATENT DOCUMENTS

| | | | |
|---|---|---|---|
| 10,073,890 B1* | 9/2018 | Khamis | G06F 16/285 |
| 2014/0101171 A1* | 4/2014 | Danielyan | G06F 40/284 |
| | | | 707/E17.058 |

(Continued)

OTHER PUBLICATIONS

Jiang, et al., "HOVER: A Dataset for Many-Hop Fact Extraction and Claim Verficiation," arXiv:2011.03088v2, Nov. 16, 2020 (20 pages).

(Continued)

*Primary Examiner* — Abul K Azad
(74) *Attorney, Agent, or Firm* — McCarter & English, LLP

(57) ABSTRACT

Machine learning (ML) systems and methods for fact extraction and claim verification are provided. The system receives a claim and retrieves a document from a dataset. The document has a first relatedness score higher than a first threshold, which indicates that ML models of the system determine that the document is most likely to be relevant to the claim. The dataset includes supporting documents and claims including a first group of claims supported by facts from more than two supporting documents and a second group of claims not supported by the supporting documents. The system selects a set of sentences from the document. The set of sentences have second relatedness scores higher than a second threshold, which indicate that the ML models determine that the set of sentences are most likely to be relevant to the claim. The system determines whether the claim includes facts from the set of sentences.

39 Claims, 16 Drawing Sheets

(51) Int. Cl.
*G06F 40/295* (2020.01)
*G06N 5/04* (2023.01)
*G06F 16/35* (2019.01)

(56) References Cited

U.S. PATENT DOCUMENTS

2021/0027405 A1* 1/2021 Lundberg ............... G06Q 10/06
2021/0056261 A1* 2/2021 Sullivan .................. G06F 40/20
2021/0397799 A1* 12/2021 Hashimoto ............. G06F 40/58

OTHER PUBLICATIONS

Asai, et al., "Learning to Retrieve Reasoning Paths Over Wikipedia Graph for Question Answering," arXiv:1911.10470v2, Feb. 14, 2020 (22 pages).
Augenstein, et al., "MultiFC: A Real-World Multi-Domain Dataset for Evidence-Based Fact Checking of Claims," Proceedings of the 2019 Conference on Empirical Methods in Natural Language Processing and the 9th International Joint Conference on Natural Language Processing, Nov. 3-7, 2019 (13 pages).
Bowman, et al., "A Large Annotated Corpus for Learning Natural Language Inference," arXiv:1508.05326v1, Aug. 21, 2015 (11 pages).
Chen, et al., "Reading Wikipedia to Answer Open-Domain Questions," arXiv:1704.00051v2, Apr. 28, 2017 (10 pages).
Chen, et al., "Understanding Dataset Design Choices for Multi-hop Reasoning," arXiv:1904.12106v1, Apr. 27, 2019 (7 pages).
Chen, et al., "Seeing Things From a Different Angle: Discovering Diverse Perspectives About Claims," arXiv:1906.03538v1, Jun. 8, 2019 (16 pages).
Chen, et al., "Uncertain Natural Language Inference," arXiv:1909.03042v2, May 5, 2020 (8 pages).
Chen, et al., "TabFact: A Large-Scale Dataset for Table-Based Fact Verification," arXiv:1909.02164v5, Jun. 14, 2020 (25 pages).
Clark, et al. "Transformers as Soft Reasoners Over Language," arXiv:2002.05867v2, May 5, 2020 (15 pages).
Dagan, et al., "Recognizing Textual Entailment: Rational, Evaluation and Approaches," Natural Language Engineering (2009) (17 pages).
Devlin, et al. "BERT: Pre-Training of Deep Bidirectional Transformers for Language Understanding," Proceedings of North American Chapter of the Association for Computational Linguistics: Human Language Technologies (2019) (16 pages).
Fang, et al., "Hierarchical Graph Network for Multi-Hop Question Answering," arXiv:1911.03631v4, Oct. 6, 2020 (16 pages).
Ferreira, et al., "A Novel Data-Set for Stance Classification," Proceedings of the 2016 Conference of the North American Chapter of the Association for Computational Linguistics: Human Language Technologies (6 pages).
Hidey, et al., "DeSePtion: Dual Sequence Prediction and Adversarial Examples for Improved Fact-Checking," Proceedings of the 58th Annual Meeting of the Association for Computational Linguistics, Jul. 5-10, 2020 (14 pages).
Jansen, "Multi-Hop Inference for Sentence-Level TextGraphs: How Challenging is Meaningfully Combining Information for Science Question Answering?," Proceedings of the Twelfth Workshop on Graph-Based Methods for Natural Language Processing (TextGraphs-12), Jun. 6, 2018 (6 pages).
Jansen, et al., "WorldTree: A Corpus of Explanation Graphs for Elementary Science Questions Supporting Multi-Hop Inference," In Proceedings of the Eleventh International Conference on Language Resources and Evaluation (2018) (9 pages).
Jiang, et al., "Avoiding Reasoning Shortcuts: Adversarial Evaluation, Training, and Model Development for Multi-Hop QA," in Proceedings of the 57th Annual Meeting of the Association for Computational Linguistics (2019) (11 pages).
Khashabi, et al., "Looking Beyond the Surface: A Challenge Set for Reading Comprehension over Multiple Sentences," in Proceedings of the 2018 Conference of the North American Chapter of the Association for Computational Linguistics: Human Language Technologies (11 pages).
Mihaylov, et al., "Can a Suit of Armor Conduct Electricity? A New Dataset for Open Book Question Answering," arXiv:1809.02789v1, Sep. 8, 2018 (14 pages).
Min, et al., "Compositional Questions Do Not Necessitate Multi-hop Reasoning," arXiv:1906.02900v1, Jun. 7, 2019 (9 pages).
Nie, et al., "Combining Fact Extraction and Verification with Neural Semantic Matching Networks," arXiv:1811.07039v1, Nov. 16, 2018 (10 pages).
Nie, et al., "Revealing the Importance of Semantic Retrieval For Machine Reading at Scale," Proceedings of the 2019 Conference on Empirical Methods in Natural Language Processing and the 9th International Joint Conference on Natural Language Processing (2019) (14 pages).
Pavlick, et al., "Inherent Disagreements in Human Textual Inferences," Transactions of the Association for Computational Linguistics (2019) (18 pages).
Perez, et al., "Unsupervised Question Decomposition for Question Answering," arXiv:2002.09758v3, Oct. 6, 2020 (17 pages).
Qi, et al., "Answering Complex Open-Domain Questions Through Iterative Query Generation," Proceedings of the 2019 Conference on Empirical Methods in Natural Language Processing and the 9th International Joint Conference on Natural Language Processing (13 pages).
Ramirez, et al., "Understanding the Impact of Text Highlighting in Crowdsourcing Tasks," arXiv:1909.02780v1, Sep. 6, 2019 (9 pages).
Rudinger, et al., "Gender Bias in Coreference Resolution," arXiv:1804.09301v1, Apr. 25, 2018 (7 pages).
Sakaguchi, et al., "WinoGrande: An Adversarial Winograd Schema Challenge at Scale," arXiv:1907.10641v2, Nov. 21, 2019 (9 pages).
Schuster, et al., "Towards Debiasing Fact Verification Models," arXiv:1908.05267v2, Aug. 31, 2019 (9 pages).
Talmor, et al., "The Web as a Knowledge-Base for Answering Complex Questions," in Proceedings of the 2018 Conference of the North American Chapter of the Association for Computational Linguistics: Human Language Technologies (11 pages).
Thorne, et al., "Fever: A Large-Scale Dataset for Fact Extraction and VERification," arXiv:1803.05355v3, Dec. 18, 2018 (20 pages).
Thorne, et al., "The Second Fact Extraction and VERification (FEVER2.0) Shared Task," Proceedings of the Second Workshop on Fact Extraction and VERification (FEVER) (2019) (6 pages).
Machos, et al., "Fast Checking: Task Definition and Dataset Construction," Proceedings of the ACL 2014 Workshop on Language Technologies and Computational Social Science (5 pages).
Wang, "Liar, Liar Pants on Fire: A New Benchmark Dataset for Fake News Detection," Proceedings of the 55th Annual Meeting of the Association for Computational Linguistics (Short Papers) (2017) (5 pages).
Welbl, et al., "Constructing Datasets for Multi-hop Reading Comprehension Across Documents," arXiv:1710.06481v2, Jun. 11, 2018 (21 pages).
Williams, et al., "A Broad-Coverage Challenge Corpus for Sentence Understanding through Inference," in Proceedings of the 2018 Conference of the North American Chapter of the Association for the Computational Linguistics: Human Language Technologies (11 pages).
Xie, et al., "WorldTree V2: A Corpus of Science-Domain Structured Explanations and Inference Patterns Supporting Multi-Hop Inference," Proceedings of the 12th Conference on Language Resources and Evaluation (2020) (18 pages).
Yang, et al., "HOTPOTQA: A Dataset for Diverse, Explainable Multi-hop Question Answering," arXiv.1809.09600v1, Sep. 25, 2018 (12 pages).
Zaenen, et al., "Local Textual Inference: Can it be Defined or Circumscribed?," Proceedings of the ACL Workshop on Empirical Modeling of Semantic Equivalence and Entailment (2005) (6 pages).
Zhao, et al., "Transformer-XH: Multi-Evidence Reasoning with extra Hop Attention," in International Conference on Learning Representations (2020) (16 pages).

(56) References Cited

OTHER PUBLICATIONS

"Hover—A Datatset for Many-Hop Fact Extraction and Claim Verification," https://hover-nlp.github.io, known as least as early as Nov. 9, 2020 (2 pages).
Alhindi, et al., "Where is Your Evidence: Improving Fact Checkin,g by Justification Modeling," Proceedings of the First Workshop on Fact Extraction and Verification (2018) (6 pages).
Zhi, et al., "ClaimVerif: A Real-Time Claim Verification System Using the Web and Fact Databases," CIKM'17, Nov. 6-17, 2017, Singapore (4 pages).

* cited by examiner

Stage 1: Claim Creation

Creating 2-hop Claims from HpQA
Question: Telos was an album by a band who formed in what city?
Answer: Indianapolis
Claim: Telos was an album by a band formed in Indianapolis Claim Validation
Good: Telos was an album by a band formed in Indianapolis.
Bad: Telos was an album by a band formed in what city Indianapolis Creating 3/4-hop Claims
3-Hop: Telos was an album by a band formed in the state capital of Indiana
4-Hop: Telos was an album by a band formed in the capital of a state. This state is the 17th most populous state of the 50 United States.

Stage 2: Claim Mutation

More General
Supported: Telos was a music collection by a band formed in Indianapolis More Specific
Supported: Telos was an album by a band formed in Indianapolis in 2009
Not Supported: Telos was an album by a band formed in Indianapolis in 1950

Automatic Word Substitution using Bert
Supported : Telos was an album by a group formed in Indianapolis
Not Supported: Telos was an opera by a band formed in Indianapolis Automatic Entity Substitution
Not Supported: Telos was an album by a band formed in Liverpool
Not Supported: Albert was an album by a band formed in Indianapolis

Stage 3: Claim Labeling

Not Valid: Telos was an album by an American Christian metal band who formed in Indianapolis Supported: Telos was a music collection by a band formed in Indianapolis Supported: Telos was an album by a band formed in Indianapolis in 2009

Not Supported: Telos was an album by a band formed in Indianapolis in 1950

Not Supported: Telos was an album by a band formed in Antarctica

Not Supported: Albert was an album by a band formed in Indianapolis

FIG. 3

| # | Reasoning Graph | Examples |
|---|---|---|
| 2 | A—B | Claim: Patrick Carpentier currently drives a Ford Fusion, introduced for model year 2006, in the NASCAR Sprint Cup Series.<br>Doc A: Ford Fusion is manufactured and marketed by Ford. Introduced for the 2006 model year. ...<br>Doc B: Patrick Carpentier competed in the NASCAR Sprint Cup Series, driving the Ford Fusion. |
| 3 | A—B—C | Claim: The Ford Fusion was introduced for model year 2006. *The Rookie of The Year in the 1997 CART season* drives it in the NASCAR Sprint Cup Series.<br>Doc B: The 1997 CART PPG World Series season, the nineteenth in the CART era of U.S. open-wheel racing, consisted of 17 races, ... Rookie of the Year was Patrick Carpentier. |
| 4 | B—C, A—B | Claim: *The model of car Trevor Bayne drives* was introduced for model year 2006. The Rookie of The Year in the 1997 CART season drives it in the NASCAR Sprint Cup.<br>Doc D: Trevor Bayne is an American professional stock car racing driver. He last competed in the NASCAR Cup Series, driving the No. 6 Ford Fusion... |
| | A—B—D | Claim: The Ford Fusion was introduced for model year 2006. It was driven in the NASCAR Sprint Cup Series by The Rookie of The Year of a Cart season, in which the *1997 Marlboro 500* was the *17th and last round*.<br>Doc D: The 1997 Marlboro 500 was the 17th and last round of the 1997 CART season... |
| | A—B, C—D | Claim: The Ford Fusion was introduced for model year 2006. The Rookie of The Year in the 1997 CART season drives it in the series held by *the group that held an event at the Saugus Speedway*.<br>Doc D: Saugus Speedway is a 1/3 mile racetrack in Saugus, California on a 35 acre site. The track hosted one NASCAR Craftsman Truck Series event in 1995... |

FIG. 4

Original Claim: This Maroon 5 song, is one of the songs that Zaedan is best known for remixing. He is a Swedish songwriter who worked with Taylor Swift.
Choices: *[song, one, songs, best, known, remixing, songwriter, worked]*
Random Picks: *[songs, songwriter]*
BERT Mutated Claim: This Maroon 5 song, is one of the tracks that Zaedan is best known for remixing. He is a Swedish producer who worked with Taylor Swift.

| Paragraph 1: Northwestern University | Paragraph 2: Middlebury College |
|---|---|
| Northwestern University (NU) is a private research university based in Evanston, Illinois, with other campuses located in Chicago and Doha, Qatar, and academic programs and facilities in Washington, D.C., and San Francisco, California. | Middlebury College is a private liberal arts college located in Middlebury, Vermont, United States. The college was founded in 1800 by Congregationalists making it the first operating college or university in Vermont... |

| Paragraph 3: Eddie George | Paragraph 4: Hidden Ivies |
|---|---|
| ...Post-football, George earned an MBA from Northwestern University's Kellogg School of Management. In 2016, he appeared on Broadway in the play "Chicago" as the hustling lawyer Billy Flynn.... | Hidden Ivies: Thirty Colleges of Excellence is a college educational guide published in 2000. It concerns college admissions in the United States... In the introduction, the authors further explain their aim by referring specifically to "the group historically known as the 'Little Ivies' (including Amherst, Bowdoin, Middlebury, Swarthmore, Wesleyan, and Williams)" which the authors say ... |

*Claim: The 'Little Ivies', mentioned in the book Hidden Ivies, are Amherst, Bowdoin, Swarthmore, Wesleyan, Williams and one other. That other "Little Ivy" and the institution where Eddie George earned an MBA from, are both private schools in Pennsylvania.*

| Paragraph 1: Flashbacks of a Fool | Paragraph 2: Emilia Fox |
|---|---|
| ... The film was directed by Baillie Walsh, and stars Daniel Craig, Harry Eden, Claire Forlani, Felicity Jones, Emilia Fox, Eve, Jodhi May, Helen McCrory and Miriam Karlin. | ... She also appeared as Morgause in the BBC's "Merlin" beginning in the programme's second series. She was educated at Bryanston School in Blandford, Dorset. |

*Claim: Emilia Fox was a cast member of Flashbacks of a Fool was educated at Blandford Forum in Blandford, Dorset.*

FIG. 6

| Title | Wikipedia Article |
|---|---|
| Shanghai Noon | 1. Shanghai Noon is a 2000 American-Hong Kong martial arts western comedy film starring Jackie Chan, Owen Wilson and Lucy Liu.<br>2. The first in the "Shanghai (film series)".<br>3. The film, marking the directorial debut of Tom Dey, was written by Alfred Gough and Miles Mill |
| Tom Dey | 1. Thomas Ridgeway "Tom" Dey (born April 14, 1965) is an American film director, screenwriter, and producer.<br>2. His credits include "Shanghai Noon", "Showtime", "Failure to Launch", and "Marmaduke". |
| Roger Yuan | 1. Roger Winston Yuan (born January 25, 1961) is an American Actor, martial arts fight trainer, action coordinator who trained many actors and actresses in many Hollywood films.<br>2. As an actor himself, he also appeared in "Shanghai Noon" (2000) opposite Jackie Chan, "Bulletproof Monk" (2003) alongside Chow Yun-fat, the technician in "Batman Begins" (2005), and as the Severine's bodyguard in "Skyfall" (2012).<br>3. He is a well-recognized choreographer in Hollywood. |
| Once Upon a Time in Vietnam | 1. Once Upon a Time in Vietnam (Vietnamese: Lua Phat ) is a 2013 Vietnamese action fantasy film directed by and starring Dustin Nguyen along with Roger Yuan.<br>2. It was released on August 22, 2013.<br>3. This is the first Vietnamese action fantasy film. |
| 2 hop Original Claim and Claim Mutations | |
| Original | Shanghai Noon was the directorial debut of an American film director whose other credits include Showtime, Failure to Launch, and Marmaduke. *Supported* |
| Entity Substitution | Shanghai Noon was the directorial debut of a Danish film director whose other credits include Showtime, Failure to Launch, and Marmaduke. *Not Supported* |
| 3 hop Original Claim and Claim Mutations | |
| Original | The film Roger Yuan appeared in was the directorial debut of an American film director. The director's other credits include Showtime, Failure to Launch, and Marmaduke. *Supported* |
| More Specific | The film Roger Yuan starred in was the directorial debut of an American film director. The director's other credits include Showtime, Failure to Launch, and Marmaduke. *Not Supported* |
| Entity Substitution | The film Roger Yuan appeared in was the directorial debut of an American film director. The director's other credits include Showtime, Failure to Launch, and Steve Jaggi. *Not Supported* |
| 4 hop Original Claim and Claim Mutations | |
| Original | Roger Yuan starred in Once Upon a Time in Vietnam and another film that was the directorial debut of an American film director. The director's other credits include the Showtime, Failure to Launch, and Marmaduke. *Supported* |
| Entity Substitution | Roger Yuan starred in Once Upon a Time in Vietnam and another film that was the directorial debut of an American film director. The director's other credits include the New York Times, Failure to Launch, and Marmaduke. *Not Supported* |

Original Claim: The school that The Charles E. Schmidt College of Science is an academic college of is in the US. Another college in the US is the institute where Cecil V. Thomas was the first president of it's predecessor.

Target Entities: "Florida Atlantic University", "Cleveland State University", "Charles E. Schmidt College of Science","Cecil V. Thomas"

Do not mutate these keywords in the claim (if any of these exist): "Charles", "Schmidt", "College", "of", "Science", "Cecil", "Thomas"

○ Click here if you don't understand the claim

Type I: Make the claim more specific (so that the new claim implies the original)

Modify the claim by replacing either a relation, property and/or an attribute of an entity to something more specific that implies the original claim

Tips and Tricks
1. Pick an entity and consider the more specific term
2. Example:
   ○ Word player can be replaced by defender or goalie to make the claim more specific.
   ○ 1960's can be replaced by 1963, 1964, ..etc.
3. Do not forget - You are adding information in this type mutation to make it more specific.
4. Do not use any external knowledge ("United States" -> "New York" as Type I) besides what is given. Not even currentdate and time
5. Rephrasing is allowed only if there is no information loss from the original claim
6. The mutated claim should imply the original claim
   Thumb Rule to check this:
   If claim mutation is true, then original claim is true

Write the mutated claim as per your understanding

[text box]

● Copy and Paste text from the original claim, if needed. CHECK THAT IT MAKES SENSE before submitting
○ Click here if all the rules stated in the guidelines are followed but the claim still does not pass through the above text box, and copy-paste the claim in the new text box.

RECAP of guidelines to make claim more specific with examples

The actor that plays Cobb in the movie Inception also stars in the movie Titanic that is directed by James Cameron.

Target Entities: Leonardo DiCaprio; Titanic (1998)

Criterion 1: Add information that is directly related to the target entities.
• The actor that plays Cobb in the movie Inception also stars in the movie Titanic that is directed and written by James Cameron.
• The Academy-winning actor that plays Cobb in the movie Inception also stars in the 1998 movie that is directed by James Cameron.

Criterion 2: Add information (WITHOUT using external knowledge) to make the claim more specific. You are allowed to make a false claim that is not nonsensical.
• The actor that plays Cobb in the movie Inception also stars in the movie Titanic that is directed by James Cameron and written by Mary Williams.

Criterion 3: DON'T add a target entity to the claim if it was not originally in the claim! Neither can you add an entity that is explained in a relative clause or phrase in the original claim.

Below are some bad examples:
• The actor, Leonardo DiCaprio, that plays Cobb in the movie Inception also stars in the movie Titanic that is directed by James Cameron.
• The actor, Brad Pitt, that plays Cobb in the movie Inception also stars in the movie Titanic that is directed by James Cameron.

Step 1: Review the original Claim

Claim: The netflix series, produced by Joe Swanberg, that had an actress best known for her role as Vanessa on "Chicago" was called Easy.

Step 2: Read the facts and answer the questions

Paragraph 1: Zazie Beetz

1: Zazie Beetz (born 1991) is a German-born, American actress best known for the role of Vanessa on "Atlanta".
2: In 2016, she also appeared in the Netflix anthology series "Easy".
3: Beetz has been cast as the Marvel Comics character Neena Thurman / Domino in "Deadpool 2".

Paragraph 2: Easy (TV series)

1: Easy is a comedy-drama anthology series written, directed, edited and produced by Joe Swanberg.
2: It consists of eight half-hour episodes.
3: The series is set in Chicago.
4: The first season was released on Netflix on September 22, 2016.

Is the claim Grammatically and Logically correct so that you can understand what it expresses?
- ⊙ Yes
- ○ No ⊙ This question should be answered based on the information that can used from all four paragraphs above

Is the Mutated Claim Supported or Refuted by the paragraphs provided?
- ○ Supported: Without using external knowledge, I have strong reason to believe the claim is TRUE given the selected sentences.
- ○ Refuted: Without using external knowledge, it is IMPOSSIBLE for the claim to be true given the selected sentences.
- ○ NotEnoughInfo: I need more information other than the given paragraphs to say whether the claim is True or False.

Don't use any external knowledge that is not stated in the supporting paragraphs. The highlighted words are not from the paragraph. They are substituted with other words that are in the paragraph. Quick Guidelines to make a decision:

1. If you think the claim directly entails/contradict the paragraphs using ONLY your knowledge of English (e.g., being a captain entails also being a leader), select Supported or Refuted.

2. Whenever you are not sure whether a claim is Refuted or NotEnoughInfo, ask yourself "Is it possible for this claim to be true based on the information from paragraphs?" If yes, select NotEnoughInfo; otherwise, select Refuted.

3. For example, a person can be both captain and choreographer, but it is almost impossible for a city to be called both Big Apple and Big Orange at th esame time.

| Split | #Hops | SUPPORTED | NOT-SUP | TOTAL |
|---|---|---|---|---|
| Train | 2 | 6496 | 2557 | 9053 |
|  | 3 | 3271 | 2813 | 6084 |
|  | 4 | 1256 | 1778 | 3034 |
| Dev | 2 | 521 | 605 | 1126 |
|  | 3 | 968 | 867 | 1835 |
|  | 4 | 511 | 528 | 1039 |
|  | Total | 2000 | 2000 | 4000 |
| Test | - | 2000 | 2000 | 4000 |
| Total | - | 15023 | 11148 | 26171 |

| Hit@ | #Hops | | | Overall |
|---|---|---|---|---|
| | 2 | 3 | 4 | |
| 5 | 42.10 | 9.97 | 0.38 | 16.53 |
| 10 | 53.37 | 15.91 | 2.89 | 23.08 |
| 25 | 66.16 | 24.90 | 6.83 | 31.83 |
| 100 | 80.02 | 39.18 | 15.59 | 44.55 |

310

| Models | #Hops | | | Overall |
|---|---|---|---|---|
| | 2 | 3 | 4 | |
| BERT | 30.1/69.5 | 5.6/57.6 | 0.6/52.6 | 11.2/59.1 |
| BERT* | 34.0/69.9 | 5.8/58.2 | 1.0/53.4 | 12.5/60.2 |
| Oracle | 50.9/81.7 | 28.1/79.1 | 26.2/82.2 | 34.0/80.6 |
| Human | 85.0/92.5 | 82.4/95.3 | 65.8/91.4 | 77.0/93.5 |

| Models | #Hops | | | Overall |
|---|---|---|---|---|
| | 2 | 3 | 4 | |
| BERT | 13.6/57.2 | 1.9/49.8 | 0.2/45.0 | 4.8/50.6 |
| BERT* | 9.1/52.0 | 1.3/45.4 | 0.3/41.2 | 3.2/46.2 |
| Oracle | 25.0/68.3 | 18.4/71.5 | 17.1/76.4 | 19.9/71.9 |
| Human | 75.0/86.5 | 73.5/93.1 | 42.1/87.3 | 56.0/88.7 |

| Models | #Hops | | | Overall |
|---|---|---|---|---|
| | 2 | 3 | 4 | |
| BERT + ORACLE | 79.8 | 83.5 | 78.6 | 81.2 |
| Claim-only | 57.5 | 67.7 | 63.6 | 63.7 |
| Human + ORACLE | 92.6 | 88.4 | 87.2 | 90.0 |

| Models | Accuracy(%) | HoVer Score (%) |
|---|---|---|
| BERT + GOLD | 67.6 | 14.9 |
| BERT + RETR | 73.7 | 14.5 |
| Human | 88.0 | 81.0 |

| Model | Evidence F1 | HoVer Score (%) |
|---|---|---|
| BERT | 49.5 | 15.32 |

FIG. 17

MACHINE LEARNING SYSTEMS AND METHODS FOR MANY-HOP FACT EXTRACTION AND CLAIM VERIFICATION

RELATED APPLICATIONS

This application claims priority to U.S. Provisional Patent Application Ser. No. 63/118,074 filed on Nov. 25, 2020, the entire disclosure of which is hereby expressly incorporated by reference.

BACKGROUND

Technical Field

The present disclosure relates generally to the field of machine learning. More specifically, the present disclosure relates to machine learning systems and methods for many-hop fact extraction and claim verification.

Related Art

The proliferation of social media platforms and digital content has been accompanied by a rise in deliberate disinformation and hoaxes, leading to polarized opinions among masses. With the increasing number of inexact statements, there is significant interest in fact-checking systems that can verify claims based on automatically-retrieved facts and evidence. Some examples of fact extraction and claim verification provide an open-domain fact extraction and verification dataset closely related to this real-world application. However, more than 87% of the claims in these examples require information from a single Wikipedia article. Additionally, real-world claims might refer to information from multiple sources. Some question-and-answer (QA) datasets represent the first efforts to challenge models to reason with information from multiple sources. However, such datasets cannot distinguish multi-hop models from single-hop models and are not effective for the multi-hop models.

Moreover, some example models are shown to degrade in adversarial evaluation, where word-matching reasoning shortcuts are suppressed by extra adversarial documents. Some example open-domain settings are limited to two supporting documents that are retrieved by a neural model exploiting a single hyperlink. Hence, while providing very useful starting points for the community, some open-domain fact extraction and verification datasets are mostly restricted to a single-hop setting and some example multi-hop QA datasets are limited by the number of reasoning steps and the word overlapping between a question and all the evidences.

Accordingly, what would be desirable are machine learning systems and methods for many-hop fact extraction and claim verification, which address the foregoing, and other, needs.

SUMMARY

The present disclosure relates to machine learning systems and methods for many-hop fact extraction and claim verification. The system receives a claim comprising one or more sentences. The system retrieves, based at least in part on one or more machine learning models, a document from a dataset. The document has a first relatedness score higher than a first threshold. The first relatedness score indicates that the one or more machine learning models determines that the document is most likely to be relevant to the claim. The dataset comprises a plurality of supporting documents and a plurality of claims. The plurality of claims include a first group of claims supported by facts from more than two supporting documents from the plurality of supporting documents and a second group of claims not supported by the plurality of supporting documents. The system selects, based at least in part on the one or more machine learning models, a set of sentences from the document. The set of sentences has second relatedness scores higher than a second threshold. The second relatedness scores indicate that the one or more machine learning models determine that the set of sentences are most likely to be relevant to the claim. The system determines, based at least in part on the one or more machine learning models, whether the claim includes one or more facts from the set of sentences.

BRIEF DESCRIPTION OF THE DRAWINGS

The foregoing features of the invention will be apparent from the following Detailed Description of the Invention, taken in connection with the accompanying drawings, in which:

FIG. 3 is a flowchart illustrating data collection steps for the "HoVer" dataset of the present disclosure;

FIG. 4 is a table showing types of many-hop reasoning graphs for extracting evidence and verifying claims in a dataset, in accordance with the present disclosure;

FIG. 5 illustrates an example automatic word substitution for claim mutation of the present disclosure;

FIG. 6 illustrates ambiguities in paragraphs of information capable of being detected by the systems of the present disclosure;

FIG. 7 illustrates original claims, mutated claims, supporting documents, and labels created by the system of the present disclosure;

FIG. 8 illustrates a screenshot of a user interface generated by the system of the present disclosure for gathering data to be processed by many-hop machine learning;

FIG. 9 illustrates a screenshot of a user interface generated by the system of the present disclosure to create more specific claims;

FIG. 10 illustrates a screenshot of a user interface generated by the system of the present disclosure for labeling claims;

FIG. 11 is a table showing the sizes of supported and non-supported classes and associated hops for creating machine learning models of the system of the present disclosure;

FIG. 13 illustrates performance of TF-IDF document retrieval and EM/F1 scores of neural based document retrieval models evaluated on supported claims by the system of the present disclosure;

FIG. 14 illustrates EM/F1 scores of sentence retrieval models evaluated on supported claims by the system of the present disclosure;

FIG. 15 illustrates claim verification accuracy of natural language inference (NLI) models evaluated on supported claims in a development set of the system of the present disclosure;

FIG. 16 illustrates claim verification accuracy and HoVer scores of an entire pipeline evaluated on supported claims by the system of the present disclosure;

FIG. 17 illustrates evidence F1 and HoVer scores of the best model from FIG. 16, evaluated on a test set of the system of the present disclosure.

DETAILED DESCRIPTION

The present disclosure relates to machine learning systems and methods for many-hop fact extraction and claim verification, as described in detail below in connection with FIGS. 1-18.

The machine learning systems and methods disclosed herein include a dataset for many-hop fact extraction and claim verification (also referred to as Hoppy Verification (HoVer)). The HoVer dataset is a custom-generated machine learning dataset that challenges machine learning systems/models to extract facts from several textual sources (e.g., Wikipedia articles) that are relevant to a claim and to classify whether the claim is supported or not supported by facts. A claim includes one or more sentences that have information about single or multiple entities, such as a statement or an assertion about the single or multiple entities without providing evidence, facts or proof. An entity can be a thing, a person, a product, an organization, an object, a concept or the like. In the HoVer dataset, the claims need evidence to be extracted from multiple textual sources (e.g., multiple documents) and the claims embody reasoning graphs of diverse shapes. The HoVer dataset includes 3-hop claims and 4-hop claims that include multiple sentences, which adds to complexity of understanding long-range dependency relations such as coreference. A coreference occurs when two or more expressions in a text refer to the same person or thing. For a particular claim, the HoVer dataset increases the number of reasoning hops and/or the number of supporting documents that provide evidence and facts to a corresponding claim, which results in significant degradation on some semantic-matching models (e.g., an existing state-of-the-art models), hence demonstrating the necessity of many-hop reasoning to facilitate the development of machine learning systems/models (e.g., semantic-matching models, natural language processing models, or the like). In some embodiments, claims of the HoVer dataset need evidence from as many as four English Wikipedia articles and contain significantly less semantic overlap between the claims and some supporting documents to avoid reasoning shortcuts. In some embodiments, the HoVer dataset includes 26 k claims. Importantly, the machine learning datasets (e.g., the HoVer dataset) generated by the systems and methods disclosed herein significantly improve the accuracy of machine learning systems and models.

Figure 1:
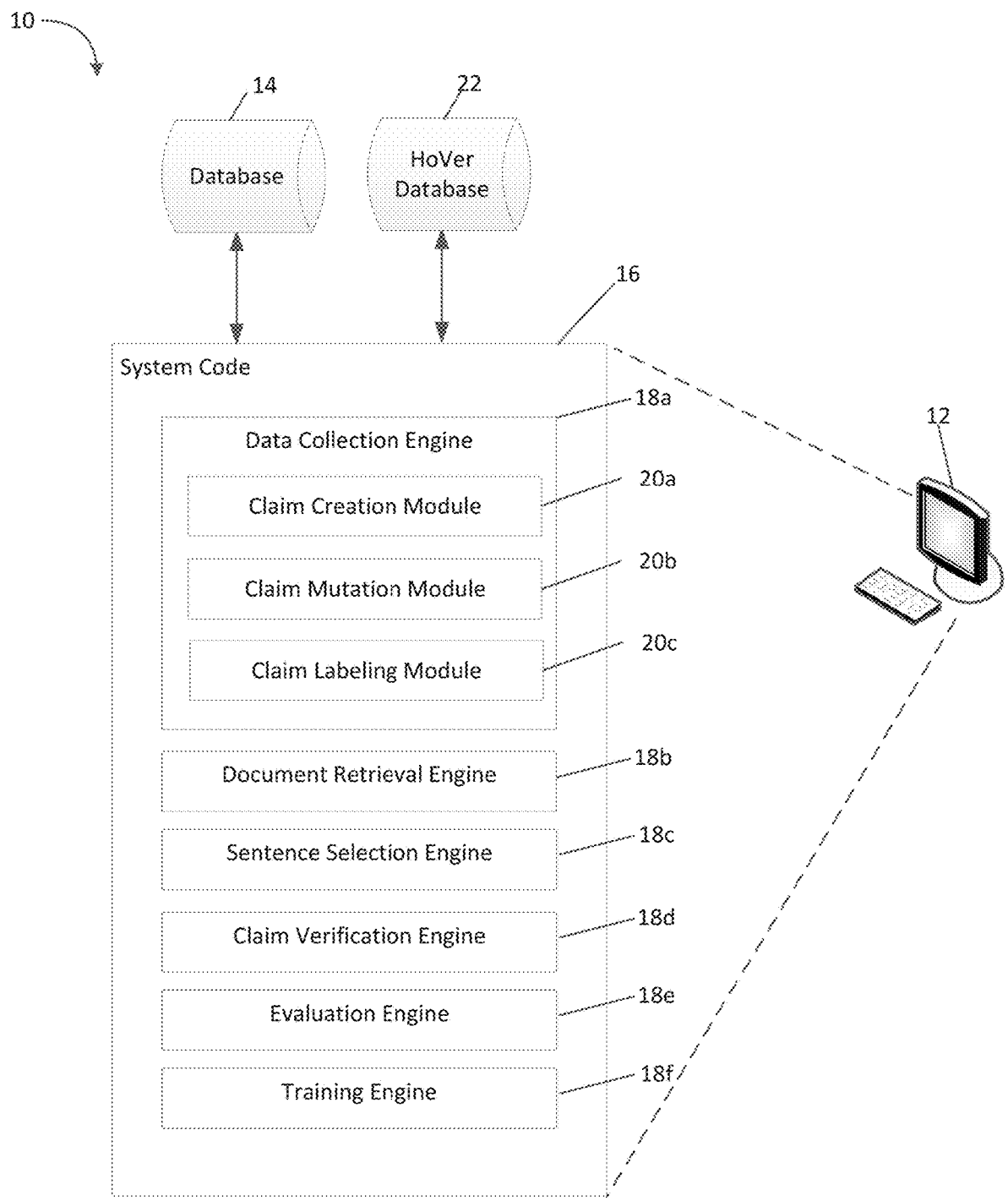
FIG. 1 is a diagram illustrating an embodiment of the system of the present disclosure.

Turning to the drawings, FIG. 1 is a diagram illustrating an embodiment of the system 10 of the present disclosure. The system 10 can be embodied as a central processing unit 12 (processor) in communication with a database 14 and a HoVer database 22. The processor 12 can include, but is not limited to, a computer system, a server, a personal computer, a cloud computing device, a smart phone, or any other suitable device programmed to carry out the processes disclosed herein. The system 10 can retrieve data from the database 14 associated with one or more machine learning models, and from the HoVer database 22.

The database 14 can include various types of data including, but not limited to, one or more machine learning models, and one or more outputs from various components of the system 10 (e.g., outputs from a data collection engine 18*a*, a claim creation module 20*a*, a claim mutation module 20*b*, a claim labeling module 20*c*, a document retrieval engine 18*b*, a sentence selectin module 18*c*, a claim verification engine 18*d*, an evaluation engine 18*e*, and a training engine 18*f*). Examples of a machine learning model can include a natural language processing model, a natural language inference model, a language representation model, a pre-trained machine learning model (e.g., a pre-trained natural language processing model, a pre-trained natural language inference model, a pre-trained language representation model, or the like), a neural-based document retrieval model, a neural-based sentence selectin model, a neural network model, or any suitable machine learning model for fact extraction and claim verification.

The HoVer database 22 includes a HoVer dataset having multiple supporting documents and multiple claims. The multiple claims include a first group of claims and a second group of claims. The first group of claims include claims supported by facts from more than two supporting documents. A supporting document can provide one or more facts to support a claim of the first group of claims. The second group of claims includes claims that are not supported by any of the supporting documents. Examples of the HoVer dataset are further described in FIGS. 3-7.

The system 10 includes system code 16 (non-transitory, computer-readable instructions) stored on a computer-readable medium and executable by the hardware processor 12 or one or more computer systems. The system code 16 can include various custom-written software modules that carry out the steps/processes discussed herein, and can include, but is not limited to, the data collection engine 18*a*, the claim creation module 20*a*, the claim mutation module 20*b*, the claim labeling module 20*c*, the document retrieval engine 18*b*, the sentence selectin module 18*c*, the claim verification engine 18*d*, the evaluation engine 18*e*, and the training engine 18*f*. The system code 16 can be programmed using any suitable programming languages including, but not limited to, C, C++, C #, Java, Python, or any other suitable language. Additionally, the system code 16 can be distributed across multiple computer systems in communication with each other over a communications network, and/or stored and executed on a cloud computing platform and remotely accessed by a computer system in communication with the cloud platform. The system code 16 can communicate with the database 14, which can be stored on the same computer system as the code 16, or on one or more other computer systems in communication with the code 16.

Still further, the system 10 can be embodied as a customized hardware component such as a field-programmable gate array ("FPGA"), an application-specific integrated circuit ("ASIC"), embedded system, or other customized hardware components without departing from the spirit or scope of the present disclosure. It should be understood that FIG. 1 is only one potential configuration, and the system 10 of the present disclosure can be implemented using a number of different configurations.

Figure 2:
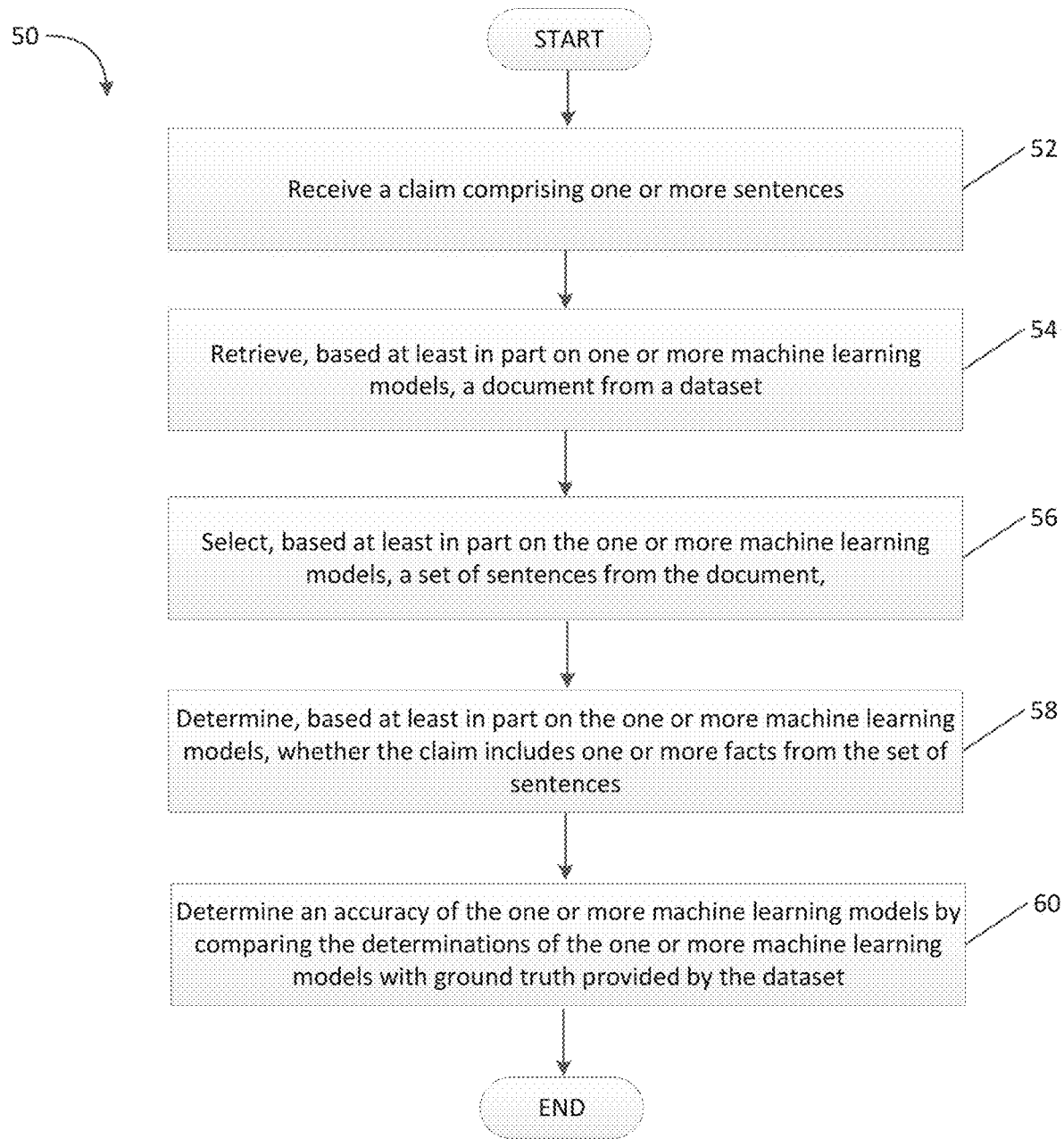
FIG. 2 is a flowchart illustrating overall processing steps carried out by the system of the present disclosure.

FIG. 2 is a flowchart illustrating overall processing steps 50 carried out by the system 10 of the present disclosure. Beginning in step 52, the system 10 receives a claim having one or more sentences. For example, the system 10 can receive a claim from a user input or from a third-party system (e.g., a computing device, a computing server, or the like). It should be understood that the system 10 can perform the aforementioned task via the document retrieval engine 18b.

In step 54, the system 10 retrieves, based at least in part on one or more machine learning models, a document from a dataset. For example, the system 10 can use a pre-trained language representation model (e.g., bidirectional-encoder-representations-from-transformers (BERT)-base models) that takes a single document $p \in P_r$ and the claim c as the input, and outputs a score that reflects the relatedness between p and c. The document p can have a relatedness score higher than a first threshold indicating that the one or more machine learning models determine that the document is most likely to be relevant to the claim. For example, the system 10 can rank the documents having relatedness scores higher that a threshold of $\kappa_p$, and selects a set $P_r$ (e.g., multiple documents of top-ranking $k_p$ documents). The system 10 can further select the document p from the set $P_r$. For example, the document p can have highest relatedness score. It should be understood that the system 10 can perform the aforementioned task via the document retrieval engine 18b.

In some embodiments, the system 10 can retrieve multiple documents in response to a query associated with claim prior to the step 54. For example, the system 10 can use a term frequency-inverse document frequency (TF-IDF) model that returns the k closest documents for a query using cosine similarity between binned uni-gram and bi-gram TF-IDF vectors. This step outputs a set $P_r$ of $k_r$ document that are processed by downstream neural models, e.g., the above BERT-base model. It should be understood that the system 10 can perform the aforementioned task via the document retrieval engine 18b.

In some embodiments, the database can be the HoVer database 22 including the first group of claims and the second group of claims. In some embodiments, the first group of claims and the second group of claims of the HoVer dataset can be created by three main stages as shown in FIG. 3 (which illustrates data collection flow chart for HoVer dataset of the present disclosure).

The first stage is referred as to claim creation that creates original claims based on question and answer pairs from one or more QA databases (e.g., HOTPOTQA database) and extends the original claims to claims supported by facts from more documents compared with the original claims. The QA database can be a remote database communicating with the system 10 via a communication network, or it can be included in the database 14. A (n-1)-hop claim can be created based on the QA questions, where n is an integer number equal to or greater than 2. For example, as shown in FIG. 3, a 2-hop claim is created from two supporting documents e.g., a question and an answer. The (n-1)-hop claim can be validated by trained users of the system to ensure the quality of the claims. For example, as shown in FIG. 3, the 2-hop claim is validated as a good claim. As another example, as shown in FIG. 4 (which illustrates a table 100 showing types of many-hop reasoning graphs to extract the evidence and to verify the claim in a dataset of the present disclosure), a valid 2-hop claim can be represented by a reasoning graph having two supporting documents A and B.

The system 10 can extend the valid (n-1)-hop claims to n-hop claims by substituting one or more entities of the valid (n-1)-hop claim with information from an additional supporting document. The information describes the one or more entities. For example, using a valid 2-hop claim c as an example, the valid 2-hop claim c includes facts from two supporting documents $A=\{a_1, a_2\}$. c is extended to a new, 3-hop claim ĉ by substituting a named entity e in c with information from another English Wikipedia article $a_3$ that describes e. The resulting 3-hop claim ĉ hence has three supporting document $\{a_1, a_2, a_3\}$. This process can be repeated to extend the 3-hop claims to include facts from the forth document.

In some embodiments, the system 10 can extend the valid (n-1)-hop claims to n-hop claims by substituting one or more entities of the valid (n-1)-hop claim with information from an additional supporting document. The additional supporting document can include a hyperlink of the one or more entities in a text body of the additional supporting document, and a title of the additional supporting document is mentioned in a text body of a supporting document of the valid (n-1)-hop claim. For example, two example methods to substitute different entities e, leading to 4-hop claims with various reasoning graphs are described below.

In an example Method 1, the entity e can be the title of a document $a_k \in A$ that supports the 2-hop claim. The additional supporting document $â \notin A$ can have a text body mentioning e's hyperlink. The system 10 can exclude â whose title is mentioned in the text body of one of the document in A. $a_3$ can be selected from a candidate group of â. The 3-hop claim ĉ is created by replacing e in c with a relative clause or phrase using information from a sentence $s \in a_3$. For example, as shown in FIG. 4, "Patrick Carpentier" is an entity in a 2-hop claim (e.g., the first row of the table 100). Document C is an additional supporting document having a text body mentioning the entity's hyperlink. A 3-hop claim (e.g., the second row of the table 100) is created by replacing "Patrick Carpentier" in the 2-hop claim with a relative clause or phrase (e.g., "The Rookie of The Year in the 1997CART season") using information from the document C. "Patrick Carpentier" is supported by the document B. Accordingly, in the reasoning graph for the 3-hop claim, a node representing the document C is connected to a node representing the document B.

In an example Method 2, the entity e can be any other entity in the 2-hop claim. For example, the entity e is not the title of the document $a_k \in A$ but exists as a hyperlink in the text body of one document in A. For example, as shown in FIG. 4, the last 4-hop claim (e.g., the fifth row of table 100) is created via this method and the entity e is "NASCAR." More particularly, the last 4-hop claim is created by replacing "NASCAR" in the 3-hop claim with a relative clause or phrase (e.g., "the group that held an event at the Saugus Speedway") using information from the document D having a text body mentions e's hyperlink. "NASCAR" is supported by the document B. Accordingly, in the reasoning graph for the last 4-hop claim, a node representing the document D is further connected to a node representing the document B in addition to a node representing the document C connected to the node representing the document B.

In some embodiments, the example Method 1 can be used to extend the collected 2-hop claims, for which at least one â. Then both example methods can used to extend the 3-hop claims to 4-hop claims of various reasoning graphs. In a 3-document reasoning graph (e.g., the graph on the second row of the table 100 in FIG. 4), the title of the middle document (e.g., the document B represented by the node B of the table 100 in FIG. 4) is substituted out during the extension from the 2-hop claim and thus does not exist in the 3-hop claim. Therefore, the example Method 1, which replaces the title of one of the three documents for supporting the claim, can only be applied to either the leftmost or the rightmost document. In order to append the fourth document to the middle document in the 3-hop reasoning graph, a non-title entity in the 3-hop claim can be substituted, which can be achieved by the example Method 2. As shown in FIG. 4, the last 4-hop claim with a star-shape reasoning graph is the result of applying Method 1 for 3-hop extension and Method 2 for the 4-hop extension, while the first two 4-hop claims on the third and fourth rows of the table 100 are created by applying the Method 1 twice. It should be understood that the system 10 can perform the aforementioned tasks via the claim creation module 20a of the data collection engine 18a.

The second stage is referred to as claim mutation, and collects new claims that are not necessarily supported by the facts. Four types of example mutation methods (e.g., shown in the middle column of FIG. 3) as described below.

In some embodiments, the system 10 can make a claim more specific or general compared with a corresponding original claim of the first group of claims. A more specific claim contains information that is not in a corresponding original claim of the first group of claims. A more general claim contains less information than a corresponding original claim. For example, titles of the supporting documents for supporting a claim can be replaced and the same set of evidence as the original claims can be used for verifications. Examples of a more general claim and a more specific claim can be found in in the middle column of FIG. 3. As another example, an original claim states that Skagen Painter Peder Severin Kroyer favored naturalism along with Theodor Esbern Philipsen and the artist Ossian Elgstrom studied with in 1907. A more specific claim states that Skagen Painter Peder Severin Kroyer favored naturalism along with Theodor Esbern Philipsen and the muralist Ossian Elgstrom studied with in 1907. A more general claim states that Skagen Painter Peder Severin Krsyer favored naturalism along with Theodor Esbern Philipsen and the artist Ossian Elgstrom studied with in the early 1900s.

In some embodiments, the system 10 can perform an automatic word substitution. In this mutation process, a word is sampled from a claim that is neither a named entity nor a stopword. A pre-trained machine learning model (e.g., a BERT-large model) can be used to predict a masked token. The system 10 can keep the claims where (1) the new word predicted by BERT and the masked word do not have a common lemma and where (2) the cosine similarity of the BERT encoding between the masked word and the predicted word lie between 0.7 and 0.8. For example, FIG. 5 illustrates an example automatic word substitution 110 for claim mutation of the present disclosure. As shown in FIG. 5, several words (e.g., words included in "Choices") can be sampled from an original claim. "song" and "songwriter" can be randomly selected. The pre-trained machine learning can predict new words (e.g., "tracks" and "producers") that are used to replace the random picks to create a mutated claim.

In some embodiments, the system 10 performs an automatic entity substitution via machine learning models (e.g. pre-trained machine learning models). For example, the system 10 can substitute named entities in the claims. The system 10 an preform a named entity recognition on the claims. The system 10 can then randomly select a named entity that is not the title of any supporting document, and replace the named entity with an entity of the same type sampled from distracting documents selected by other models (e.g., TF-IDF models). For example, as shown in FIG. 3, mutated claims 84 and 86 are created by replacing an named entity "Indianapolis" with an entity "Liverpool," and replacing an named entity "Telos" with an entity "Albert," respectively. The mutated claims 84 and 86 can be automatically labeled as not supported claims.

In some embodiments, the system 10 can perform a claim negation. The system 10 can negate the original claims by removing or adding negation words (e.g., not), or substituting a phrase with its antonyms. For example, an original claim states that the scientific name of the true creature featured in "Creature from the Black Lagoon" is Eucritta melanolimnetes. A corresponding negated claim states that the scientific name of the imaginary creature featured in "Creature from the Black Lagoon" is Eucritta melanolimnetes. It should be understood that the system 10 can perform the aforementioned tasks via the claim mutation module 20b of the data collection engine 18a.

The third stage is also referred to as claim labeling, and identifies the claims to be either "SUPPORTED," "REFUTED," or "NOTENOUGHINFO" given the supporting facts. The label "SUPPORTED" indicates the claim is true based on the facts from the supporting documents and/or linguistic knowledge of users of the system (e.g., crowd-workers). The label "REFUTED" indicates that it is impossible for the claim to be true based on the supporting documents, and that information can be found to contradict the supporting documents. The label "NOTENOUGHINFO" indicates that a claim that does not fall into one of the two categories above, which suggests additional information is needed to validate whether the claim is true or false after reviewing the paragraphs. If it is possible for a claim to be true based on the information from paragraphs, the label "NOTENOUGHINFO" can be selected.

In some embodiments, the demarcation between "NOTENOUGHINFO" or "REFUTED" is subjective and the threshold could vary. For example, FIG. 6 illustrates a table 120 including two examples showing ambiguity between "REFUTED" and "NOTENOUGHINFO" labels. In the first example, external geographical knowledge about Vermont, Illinois and Pennsylvania is needed to refute the claim. In the second example, the claim cannot be directly refuted as Emilia Fox could have also been educated at Bryanston school and Blandford Forum. In some embodiments, a label "NOT SUPPORTED" can combine the "REFUTED" and "NOTENOUGHINFO" labels into a single class. For example, as shown FIG. 3, the claims can be manually labeled (e.g., by the crowd worker) or can be automatically labeled (e.g. by classification models). As another example, FIG. 7 illustrates a table 130 showing example original claims, mutated claims with their supporting documents and labels created by the system 10 of the present disclosure. It should be understood that the system 10 can perform the aforementioned tasks via the claim labeling module 20c of the data collection engine 18a.

Figure 8:
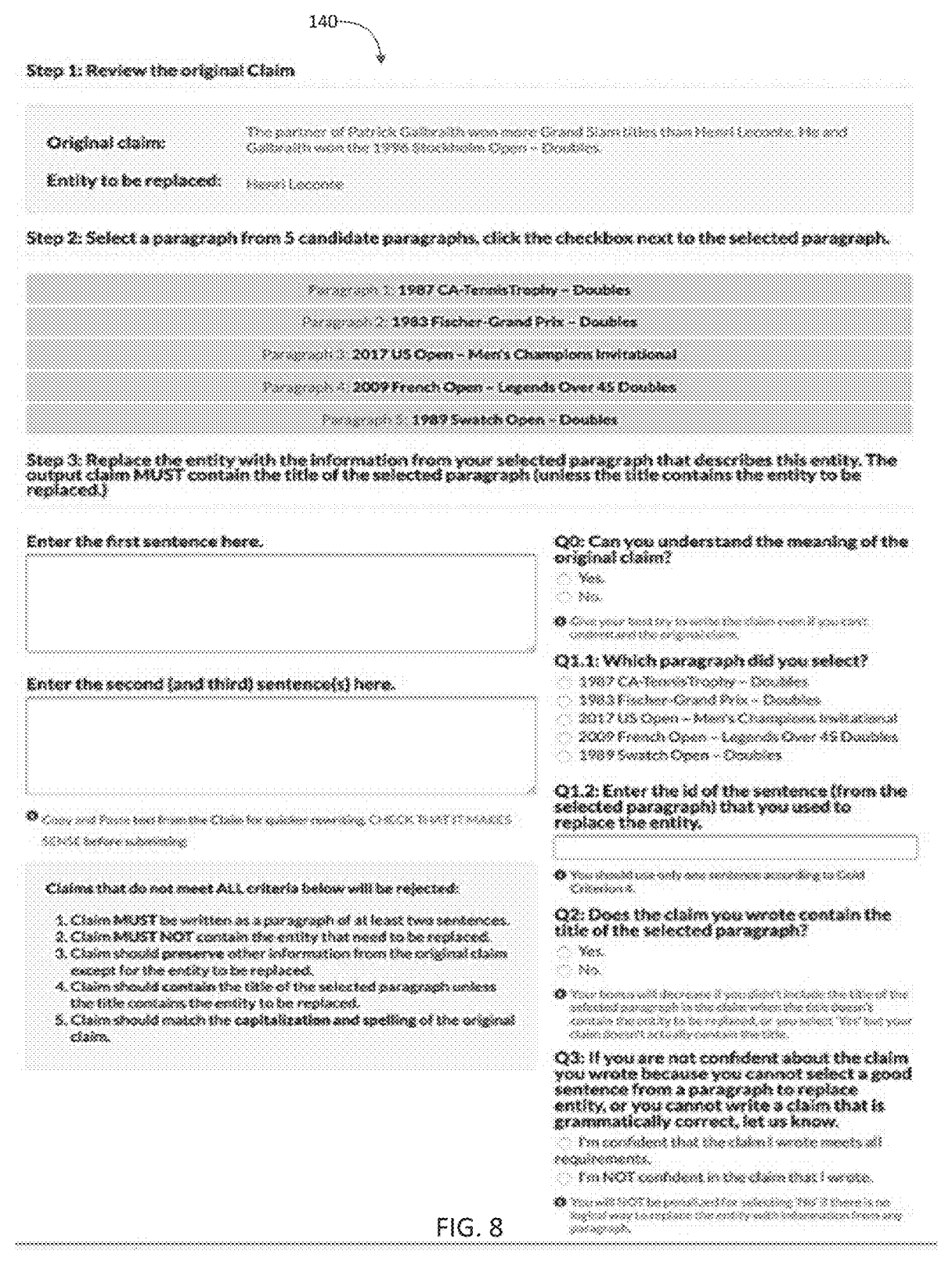

In some embodiments, the system 10 can generate various user interfaces to assist with collecting data that is processed by the system. FIG. 8 illustrates a screenshot of a user interface 140 generated by the system 10 of the present disclosure that allows a user to extend a 3-hop claim into a 4-hop claim, for subsequent machine learning by the system. FIG. 9 illustrates a screenshot of a user interface 150 generated by the system 10 of the present disclosure to create more specific claims, for subsequent machine learning by the system. FIG. 10 illustrates a screenshot of a user interface 160 generated by the system 10 of the present disclosure for labeling claims, which labels are subsequently processed by machine learning.

In some embodiments, the system 10 can perform a dataset analysis on the HoVer dataset. For example, the system 10 can partition the annotated claims and evidence of the HoVer dataset into training, development (dev), and test sets for the creation of a machine learning model. A training set is used to train a machine learning model for learning to fit parameters (e.g., weights of connections between neurons in a neural network, or the like) of the machine learning model. A development set provides an unbiased evaluation of the model fit on the training data set while tuning the model's hyperparameter (e.g., choosing the number of hidden unites in a neural network, or the like). A test set provides an unbiased evaluation of a final model fit on the training data set. The detailed statistics are shown in FIG. 11 (which illustrates a table 170 showing the sizes of the Train-Dev-Test split for SUPPORTED and NOT-SUPPORTED classes and different number of hops for the creation of machine learning models of the system 10 of the present disclosure). Because of the job complexity, judgment time, and the difficulty of quality control increase drastically along with the number of hops of a claim, in some embodiments, the HoVer dataset can use 12 k examples from a QA database (e.g., HOTPOTQA database). The 2-hop, 3-hop and 4-hop claims can have a mean length of 19.0, 24.2, and 31.6 tokens respectively as compared to a mean length of 9.4 tokens of the existing technologies.

As another example, as described above, the system 10 includes diverse many-hop reasoning graphs. As questions from HOTPOTQA database need two supporting documents, the 2-hop claims created by the system 10 using the HOTPOTQA question-answer pairs inherit the same 2-node reasoning graph as shown in the first row in FIG. 4. However, as the system 10 extends the original 2-hop claims to more hops using approaches described above, the system 10 achieves many hop claims with diverse reasoning graphs. Every node in a reasoning graph is a unique document that contains evidence, and an edge that connects two nodes represents a hyperlink from the original document or a comparison between two titles. As shown in FIG. 4, the system 10 can have three unique 4-hop reasoning graphs that are derived from the 3-hop reasoning graph by appending the 4th node to one of the existing nodes in the graph.

In some embodiments, the system 10 can perform qualitative analysis. The process of removing a bridge entity and replacing it with a relative clause or phrase adds a lot of information to a single hypothesis. Therefore, some of the ¾-hop claims are of relatively longer length and have complex syntactic and reasoning structure. In some embodiments, overly complicated claims can be discarded if they are reported as ungrammatical or incomprehensible by annotators. The resulting examples form a challenging task of evidence retrieval and multi-hop reasoning. It should be understood that the system 10 can perform the aforementioned tasks (e.g., user interface generation, dataset analysis, and qualitative analysis) via the data collection engine 18a.

Referring back to FIG. 2, in step 56, the system 10 selects, based at least in part on the one or more machine learning models, a set of sentences from the document. The set of sentences have second relatedness scores higher than a second threshold indicating that the one or more machine learning models determine that the set of sentences are most likely to be relevant to the claim. For example, the system 10 can fine-tune another machine learning model (e.g., a BERT-base model) that encodes the claim c and all sentences from the document $p \in P_n$, and predicts the sentence relatedness scores using the first token of every sentence. For example, the system 10 can rank the sentences having relatedness scores higher that a second threshold of $\kappa_s$, and selects a set $S_n$ (e.g., multiple sentences of top-ranking $k_s$ sentences). It should be understood that the system 10 can perform the aforementioned task via the sentence selection engine 18c.

In step 58, the system 10 determines, based at least in part on the one or more machine learning models, whether the claim includes one or more facts from the set of sentences. The system 10 can use a natural language inference model (e.g., BERT-base model, a binary classification model) to classify the claim based on the set of the sentences. For example, the system 10 uses the BERT-base model to recognize textual entailment between the claim c and the retrieved evidence $S_n$. The system 10 feeds the claim and retrieved evidence, separated by a [SEP] token, as the input to the BERT-base model and performs a binary classification based on the output representation of the [CLS] token at the first position. It should be understood that the system 10 can perform the aforementioned task via the claim verification engine 18d.

Figure 12:
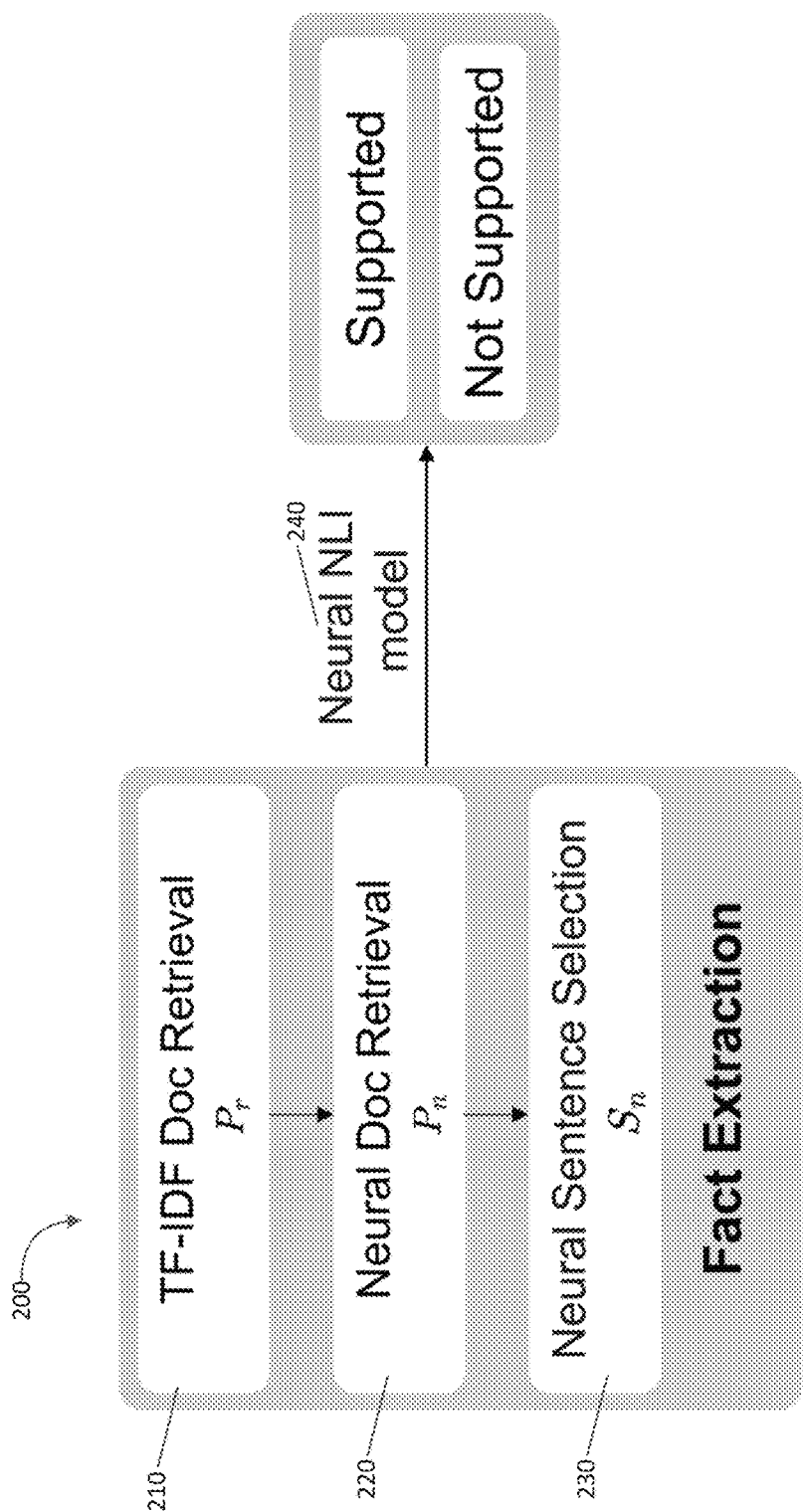
FIG. 12 is a diagram illustrating a baseline machine learning system with a 4-stage architecture in accordance with the present disclosure.

In some embodiments, the system 10 can have 4-stage architecture as shown in FIG. 12 (which illustrates a baseline system 200 with a 4-stage architecture of the present disclosure). The baseline system 200 (e.g., one of embodiments of the system 10) performs fact extraction by performing TF-IDF document retrieval 210, neural document retrieval 220, and neural sentence selection 230 sequentially. The baseline system 200 inputs the set of sentences and the claim from the fact extraction into a neural natural language inference (NLI) model 240 to determine whether the claim is supported by the set of sentences or is not supported.

In step 60, the system 10 determines an accuracy of the one or more machine learning models by comparing the determinations of the one or more machine learning models with ground truth data provided by the dataset. In some embodiments, the system 10 can evaluate an accuracy of the claim verification task to predict a claim as SUPPORTED or NOT-SUPPORTED. The document and sentence retrieval are evaluated by the exact-match and F1 scores between the predicted document/sentence level evidence and the ground-truth evidence for the claim. It should be understood that the system 10 can perform the aforementioned task via the evaluation engine 18e. Results for document retrieval, sentence selection, claim verification, and full pipeline are described below with respect to FIGS. 13-15.

In some embodiments, the system 10 uses the HoVer dataset to train the one or more machine learning models (e.g., pre-trained BERT models and pre-trained NLI models) by performing the steps 52-60 using the training set, the development set and the test set of the HoVer dataset. For example, the system 10 uses the training set to train one or more machine learning models of the system 10 for learning to fit parameters of the one or more machine learning models. The system 10 uses the development set to tune hyperparameter of the one or more machine learning models. They system 10 further uses a test set to assess the performance of the final models. It should be understood that the system 10 can perform the aforementioned task via the training engine 18f.

For example, an experimental setup of the system 10 can use the pre-trained BERT-base uncased model (with 110M parameters) for the tasks of neural document retrieval, sentence selection, and claim verification. The fine-tuning is done with a batch size of 16 and the default learning rate of 5e-5 without warmup. The system 10 sets $k_r$=20, $k_p$=5, $\kappa_p$=0.5, and $\kappa_s$=0.3 based on the memory limit and the development (dev) set performance. The system 10 selects the best dev-set verification accuracy and reports scores on the hidden test set. The entire pipeline is visualized in FIG.

12 as described above. For document retrieval and sentence selection tasks, the system 10 fine-tunes the BERT on 4 Nvidia V100 GPUs for 3 epochs. The training of both tasks takes around 1 hour. For claim verification task, the system 10 fine-tunes the BERT on a single Nvidia V100 for 3 epochs. The training finishes in 30 minutes. Experiments and results are described in FIGS. 13-15.

FIG. 13 illustrates a table 300 showing performance of TF-IDF document retrieval and a table 310 showing EM/F1 scores of neural based document retrieval models evaluated on supported claims in a development set of the system 10 of the present disclosure. The results in the table 300 show that the task becomes significantly harder for the bi-gram TF-IDF when the number of supporting documents increases. This decline in single-hop word-matching retrieval rate suggests that the HoVer dataset having extended reasoning hops is effective in terms of promoting multi-hop document retrieval and minimizing word-matching reasoning shortcuts. The system 10 then uses a BERT-base model (the 1st row in the table 310) to re-rank the top-20 documents returned by the TF-IDF. The "BERT*" (the 2nd row in the table 310) is trained with an oracle training set containing all golden documents. Overall, the performances of the neural models are limited by the low recall of the 20 input documents and the F1 scores degrade as the number of hops increase. The oracle model (the 3rd row in the table 310) is the same as "BERT*" but evaluated on the oracle data. It indicates an upper bound of the BERT retrieval model given a perfect rule-based retrieval method. These findings again demonstrate the high quality of the many-hop claims of the HoVer dataset of the system 10, for which the reasoning shortcuts are significantly reduced.

FIG. 14 illustrates a table 320 showing EM/F1 scores of sentence retrieval models evaluated on supported claims in a development set of the system 10 of the present disclosure. The system 10 evaluates neural-based sentence selection models by re-ranking the sentences within the top 5 documents returned by the neural document retrieval method. For "BERT*" (the 2nd row in the table 320), all golden documents are contained within the 5 input documents during the training. The system 10 then measures the oracle result by evaluating "BERT*" on the dev set with all golden documents presented. This suggests an upper bound of the sentence retrieval model given a perfect document retrieval method. The same trend holds as the F1 scores decrease significantly as the number of hops increases.

FIG. 15 illustrates a table 330 showing claim verification accuracy of natural language inference (NLI) models evaluated on supported claims in a development set of the system 10 of the present disclosure. In an oracle (the 1st row in the table 330) setting where the complete set of evidence is provided, the NLI model (e.g., BERT model having the oracle setting) achieves 81.2% accuracy in verifying the claims. A sanity check is conducted in a claim-only environment (the 2nd row in the table 330) where the NLI model can only exploit the bias in the claims without any evidence, in which the NLI model achieves 63.7% accuracy. Although the NLI model can exploit limited biases within the claims to achieve higher-than-random accuracy without any evidence, it is still 17.5% worse than the NLI model given the complete evidence. This suggests the NLI model can benefit from an accurate evidence retrieval model significantly.

FIG. 16 illustrates a table 340 showing claim verification accuracy and HoVer scores of an entire pipeline evaluated on supported claims in a development set of the system 10 of the present disclosure. A full pipeline ("BERT+Retr" in the table 340) uses sentence-level evidence retrieved by the best document/sentence retrieval models as the input to the NLI models, while the "BERT+Gold" is the oracle in the table 330 but evaluated with retrieved evidence instead. The system 10 further proposes the HoVer score, which is the percentage of the examples where the model retrieves at least one supporting fact from every supporting document and predicts a correct label. The performance of the best model (BERT+Gold in the table 340) on the test set in a table 350 in FIG. 17 (which illustrates a table 350 showing evidence F1 score and HoVer score of the best model of FIG. 16, evaluated on the test set of the system of the present disclosure). Overall, the best pipeline can only retrieve the complete set of evidence and predict the correct label for 14.9% of examples on the dev set and 15.32% of examples on the test set, suggesting that the HoVer dataset is indeed more challenging than the previous work of this kind, which indicating that HoVer dataset encourages the development of existing state-of-the-art models capable of performing complex many-hop reasoning in the tasks of information retrieval and verification.

The HoVer dataset provides further technical benefits. For example, claims of the HoVer dataset vary in size from one sentence to one paragraph and the pieces of evidence are derived from information from one or more documents, while other datasets include single sentence claims that are verified against the pieces of evidence retrieved from two or fewer documents. In the HoVer dataset, claims need verification from multiple documents. Prior to verification, the relevant documents and the context inside these documents are retrieved accurately, while other datasets challenge participants to fact verify claims using evidence from Wikipedia and to attack other participant's system with adversarial models. Other datasets are mostly presented in the question answering format, while the HoVer dataset is instead created for the task of claim verification. Further, the HoVer dataset is significantly larger in the size while also expanding the richness in language and reasoning paradigms.

Figure 18:
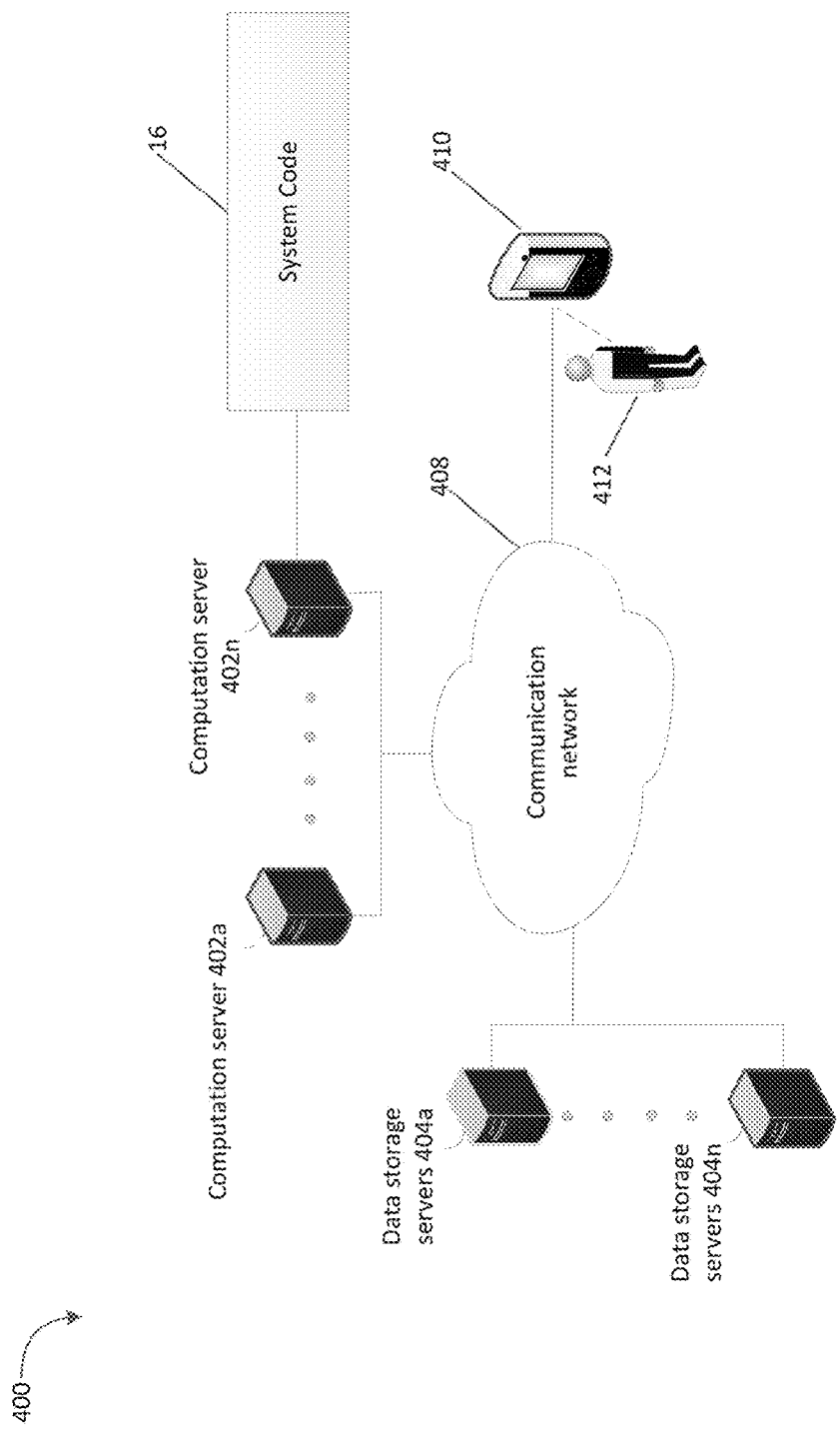
FIG. 18 is a diagram illustrating hardware and software components capable of being utilized to implement the system of the present disclosure.

FIG. 18 is a diagram illustrating computer hardware and network components on which the system 400 can be implemented. The system 400 can include a plurality of computation servers 402a-402n having at least one processor (e.g., one or more graphics processing units (GPUs), microprocessors, central processing units (CPUs), etc.) and memory for executing the computer instructions and methods described above (which can be embodied as system code 16). The system 400 can also include a plurality of data storage servers 404a-404n for storing the HoVer dataset. A user device 410 can include, but it not limited to, a laptop, a smart telephone, and a tablet to display user interfaces for data collection and to receive user inputs to a user 412, and/or to provide feedback for fine-tuning the models. The computation servers 402a-402n, the data storage servers 404a-404n, and the user device 410 can communicate over a communication network 408. Of course, the system 400 need not be implemented on multiple devices, and indeed, the system 400 can be implemented on a single (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure.

All such variations and modifications, including those discussed above, are intended to be included within the scope of the disclosure.

What is desired to be protected by Letters Patent is set forth in the following claims:

1. A machine learning system for fact extraction and claim verification, comprising:
   a memory; and
   a processor in communication with the memory, the processor:
      receiving a claim comprising one or more sentences;
      retrieving, based at least in part on one or more machine learning models, a document from a dataset, the document having a first relatedness score higher than a first threshold, wherein the first relatedness score indicates that the one or more machine learning models determines that the document is most likely to be relevant to the claim, wherein the dataset comprises a plurality of supporting documents and a plurality of claims, the plurality of claims comprising a first group of claims supported by facts from more than two supporting documents from the plurality of supporting documents and a second group of claims not supported by the plurality of supporting documents;
      selecting, based at least in part on the one or more machine learning models, a set of sentences from the document, the set of sentences having second relatedness scores higher than a second threshold, wherein the second relatedness scores indicate that the one or more machine learning models determine that the set of sentences are most likely to be relevant to the claim; and
      determining, based at least in part on the one or more machine learning models, whether the claim includes one or more facts from the set of sentences.

2. The system of claim 1, wherein the first group of claims comprise an n-hop claim created at least by a valid (n-1)-hop claim supported by one or more facts from (n-1) supporting documents of the plurality of supporting documents, wherein n is an integer number equal to or greater than 2, wherein one or more entities of the valid (n-1)-hop claim are substituted by information from an additional supporting document of the plurality of supporting documents, the information describing the one or more entities.

3. The system of claim 2, wherein the additional supporting document comprises a hyperlink of the one or more entities in a text body of the additional supporting document, and a title of the additional supporting document is mentioned in a text body of a supporting document of the valid (n-1)-hop claim.

4. The system of claim 3, wherein the one or more entities comprise a title of the supporting document, or the one more entities are part of a text body of a supporting document of the valid (n-1)-hop claim.

5. The system of claim 1, wherein the second group of claims comprise claims having information that is not in the first group of claims, or claims having less information than the first group of claims.

6. The system of claim 1, wherein the processor automatically substitutes one or more words of at least one claim of the first group of claims with one or more new words predicted by a machine learning model to form at least one claim of the second group of claims.

7. The system of claim 1, wherein the processor automatically substitutes one or more entities of at least one claim of the first group of claims with one or more new entities that are not titles of any supporting documents of the at least one claim to form at least one claim of the second group of claims.

8. The system of claim 1, wherein at least one claim of the second group of claims is created by removing or adding one or more negation words, or substituting a phrase with its antonyms in at least one claim of the first group of claims.

9. The system of claim 1, wherein the first group of claims are labeled as supported claims, and the second group of claims are labeled as not-supported claims.

10. The system of claim 1, wherein the one or more machine learning models comprise one or more pre-trained language representations models and one or more natural language inference models.

11. The system of claim 1, wherein the processor retrieves, based at least in part on the one or more machine learning models, a plurality of documents from the plurality of supporting documents in response to a query associated with the claim, wherein the document is retrieved from the plurality of documents.

12. The system of claim 1, wherein the processor determines an accuracy of the one or more machine learning models by comparing the determinations of the one or more machine learning models with ground truth provided by the dataset.

13. The system of claim 1, wherein the dataset provides reasoning graphs of diverse shapes showing relationships between the first group of claims and the plurality of supporting documents.

14. A machine learning method for fact extraction and claim verification, comprising:
   receiving a claim comprising one or more sentences;
   retrieving, based at least in part on one or more machine learning models, a document from a dataset, the document having a first relatedness score higher than a first threshold, wherein the first relatedness score indicates that the one or more machine learning models determines that the document is most likely to be relevant to the claim, wherein the dataset comprises a plurality of supporting documents and a plurality of claims, the plurality of claims comprising a first group of claims supported by facts from more than two supporting documents from the plurality of supporting documents and a second group of claims not supported by the plurality of supporting documents;
   selecting, based at least in part on the one or more machine learning models, a set of sentences from the document, the set of sentences having second relatedness scores higher than a second threshold, wherein the second relatedness scores indicate that the one or more machine learning models determine that the set of sentences are most likely to be relevant to the claim; and
   determining, based at least in part on the one or more machine learning models, whether the claim includes one or more facts from the set of sentences.

15. The method of claim 14, wherein the first group of claims comprise an n-hop claim created at least by a valid (n-1)-hop claim supported by one or more facts from (n-1) supporting documents of the plurality of supporting documents, wherein n is an integer number equal to or greater than 2, wherein one or more entities of the valid (n-1)-hop claim are substituted by information from an additional supporting document of the plurality of supporting documents, the information describing the one or more entities.

16. The method of claim 15, wherein the additional supporting document comprises a hyperlink of the one or more entities in a text body of the additional supporting document, and a title of the additional supporting document is mentioned in a text body of a supporting document of the valid (n-1)-hop claim.

17. The method of claim 16, wherein the one or more entities comprise a title of the supporting document, or the one more entities are part of a text body of a supporting document of the valid (n-1)-hop claim.

18. The method of claim 14, wherein the second group of claims comprise claims having information that is not in the first group of claims, or claims having less information than the first group of claims.

19. The method of claim 14, further comprising automatically substituting one or more words of at least one claim of the first group of claims with one or more new words predicted by a machine learning model to form at least one claim of the second group of claims.

20. The method of claim 14, further comprising automatically substituting one or more entities of at least one claim of the first group of claims with one or more new entities that are not titles of any supporting documents of the at least one claim to form at least one claim of the second group of claims.

21. The method of claim 14, wherein at least one claim of the second group of claims is created by removing or adding one or more negation words, or substituting a phrase with its antonyms in at least one claim of the first group of claims.

22. The method of claim 14, wherein the first group of claims are labeled as supported claims, and the second group of claims are labeled as not-supported claims.

23. The method of claim 14, wherein the one or more machine learning models comprise one or more pre-trained language representations models and one or more natural language inference models.

24. The method of claim 14, further comprising retrieving, based at least in part on the one or more machine learning models, a plurality of documents from the plurality of supporting documents in response to a query associated with the claim, wherein the document is retrieved from the plurality of documents.

25. The method of claim 14, further comprising determining an accuracy of the one or more machine learning models by comparing the determinations of the one or more machine learning models with ground truth provided by the dataset.

26. The method of claim 14, wherein the dataset provides reasoning graphs of diverse shapes showing relationships between the first group of claims and the plurality of supporting documents.

27. A non-transitory computer readable medium having instructions stored thereon for fact extraction and claim verification which, when executed by a processor, causes the processor to carry out the steps of:
receiving a claim comprising one or more sentences;
retrieving, based at least in part on one or more machine learning models, a document from a dataset, the document having a first relatedness score higher than a first threshold, wherein the first relatedness score indicates that the one or more machine learning models determines that the document is most likely to be relevant to the claim, wherein the dataset comprises a plurality of supporting documents and a plurality of claims, the plurality of claims comprising a first group of claims supported by facts from more than two supporting documents from the plurality of supporting documents and a second group of claims not supported by the plurality of supporting documents;
selecting, based at least in part on the one or more machine learning models, a set of sentences from the document, the set of sentences having second relatedness scores higher than a second threshold, wherein the second relatedness scores indicate that the one or more machine learning models determine that the set of sentences are most likely to be relevant to the claim; and
determining, based at least in part on the one or more machine learning models, whether the claim includes one or more facts from the set of sentences.

28. The non-transitory computer readable medium of claim 27, wherein the first group of claims comprise an n-hop claim created at least by a valid (n-1)-hop claim supported one or more facts from (n-1) supporting documents of the plurality of supporting documents, wherein n is an integer number equal to or greater than 2, wherein one or more entities of the valid (n-1)-hop claim are substituted by information from an additional supporting document of the plurality of supporting documents, the information describing the one or more entities.

29. The non-transitory computer readable medium of claim 28, wherein the additional supporting document comprises a hyperlink of the one or more entities in a text body of the additional supporting document, and a title of the additional supporting document is mentioned in a text body of a supporting document of the valid (n-1)-hop claim.

30. The non-transitory computer readable medium of claim 29, wherein the one or more entities comprise a title of the supporting document, or the one more entities are part of a text body of a supporting document of the valid (n-1)-hop claim.

31. The non-transitory computer readable medium of claim 27, wherein the second group of claims comprise claims having information that is not in the first group of claims, or claims having less information than the first group of claims.

32. The non-transitory computer readable medium of claim 27, further comprising the step of automatically substituting one or more words of at least one claim of the first group of claims with one or more new words predicted by a machine learning model to form at least one claim of the second group of claims.

33. The non-transitory computer readable medium of claim 27, further comprising the step of automatically substituting one or more entities of at least one claim of the first group of claims with one or more new entities that are not titles of any supporting documents of the at least one claim to form at least one claim of the second group of claims.

34. The non-transitory computer readable medium of claim 27, wherein at least one claim of the second group of claims is created by removing or adding one or more negation words, or substituting a phrase with its antonyms in at least one claim of the first group of claims.

35. The non-transitory computer readable medium of claim 27, wherein the first group of claims are labeled as supported claims, and the second group of claims are labeled as not-supported claims.

36. The non-transitory computer readable medium of claim 27, wherein the one or more machine learning models comprise one or more pre-trained language representations models and one or more natural language inference models.

37. The non-transitory computer readable medium of claim 27, further comprising the step of retrieving, based at least in part on the one or more machine learning models, a plurality of documents from the plurality of supporting documents in response to a query associated with the claim, wherein the document is retrieved from the plurality of documents.

38. The non-transitory computer readable medium of claim 27, further comprising the step of determining an accuracy of the one or more machine learning models by comparing the determinations of the one or more machine learning models with ground truth provided by the dataset.

39. The non-transitory computer readable medium of claim 27, wherein the dataset provides reasoning graphs of diverse shapes showing relationships between the first group of claims and the plurality of supporting documents.

* * * * *